United States Patent
Marunouchi

(10) Patent No.: US 10,133,968 B2
(45) Date of Patent: Nov. 20, 2018

(54) IMAGE FORMING APPARATUS AND IMAGE FORMING METHOD

(71) Applicants: KABUSHIKI KAISHA TOSHIBA, Tokyo (JP); TOSHIBA TEC KABUSHIKI KAISHA, Tokyo (JP)

(72) Inventor: Atsushi Marunouchi, Mishima Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/721,665

(22) Filed: Sep. 29, 2017

(65) Prior Publication Data

US 2018/0260670 A1   Sep. 13, 2018

(30) Foreign Application Priority Data

Mar. 10, 2017   (JP) .................. 2017-045841

(51) Int. Cl.
| | |
|---|---|
| G06F 3/12 | (2006.01) |
| G06K 15/02 | (2006.01) |
| G03G 15/00 | (2006.01) |
| B41J 11/00 | (2006.01) |
| B41J 13/02 | (2006.01) |
| B41J 13/10 | (2006.01) |
| B41J 11/42 | (2006.01) |
| G06K 15/00 | (2006.01) |
| G03G 15/06 | (2006.01) |
| G03G 15/04 | (2006.01) |

(52) U.S. Cl.
CPC ....... *G06K 15/1801* (2013.01); *B41J 11/0095* (2013.01); *B41J 11/42* (2013.01); *B41J 13/02* (2013.01); *B41J 13/103* (2013.01); *G03G 15/6573* (2013.01); *G03G 15/04* (2013.01); *G03G 15/06* (2013.01)

(58) Field of Classification Search
None
See application file for complete search history.

(56) References Cited

U.S. PATENT DOCUMENTS

| | | | |
|---|---|---|---|
| 2007/0071462 A1* | 3/2007 | Koitabashi | G06F 3/121 399/23 |
| 2009/0231131 A1 | 9/2009 | Ono et al. | |
| 2010/0025926 A1* | 2/2010 | Shimizu | G03G 15/5012 271/225 |

(Continued)

FOREIGN PATENT DOCUMENTS

JP   2005-331820 A   12/2005

*Primary Examiner* — Dov Popovici
(74) *Attorney, Agent, or Firm* — Patterson & Sheridan, LLP

(57) ABSTRACT

An image forming apparatus includes an image forming unit configured to perform a printing process of forming an image on a print medium based on print data, and a processor. The processor is configured to determine whether or not the printing process has completed based on remaining print data to be printed, when the print medium is removed from a paper discharge tray in which the print medium on which the image is formed by the image forming unit is placed, and to cause a warning to be output upon determining that the printing process has not completed based on the remaining print data to be printed.

16 Claims, 6 Drawing Sheets

(56) References Cited

U.S. PATENT DOCUMENTS

| 2014/0079411 A1* | 3/2014 | Saitsu | G03G 15/70 |
|---|---|---|---|
| | | | 399/21 |
| 2015/0249771 A1* | 9/2015 | Young | G06F 3/121 |
| | | | 358/1.14 |

* cited by examiner

IMAGE FORMING APPARATUS AND IMAGE FORMING METHOD

CROSS-REFERENCE TO RELATED APPLICATION

This application is based upon and claims the benefit of priority from Japanese Patent Application No. 2017-045841, filed Mar. 10, 2017, the entire contents of which are incorporated herein by reference.

FIELD

Embodiments described herein relate generally to an image forming apparatus and an image forming method.

BACKGROUND

In the related art, an image forming apparatus performs printing in response to a print request. The image forming apparatus forms an image on a print medium (e.g., sheet) such as a paper, and discharges the print medium on which the image is formed onto a paper discharge tray. The image forming apparatus includes a conveying unit that conveys the print medium and an image forming unit that forms the image on the conveyed sheet.

The image forming apparatus sometimes stops a printing process of forming an image on the print medium due to various factors such as out of paper, out of toner, the occurrence of a jam, and image stabilization processing. When the printing process stops, the image forming apparatus performs a warning display on a display unit, and thereby notifies a user that the printing process has not completed.

However, there is a problem that the user does not recognize the warning display and thus the user may take the print medium discharged onto the paper discharge tray.

DETAILED DESCRIPTION

According to one embodiment, there is provided an image forming apparatus including an image forming unit configured to perform a printing process of forming an image on a print medium based on print data, and a processor. The processor is configured to determine whether or not the printing process has completed based on remaining print data to be printed, when the print medium is removed from a paper discharge tray in which the print medium on which the image is formed by the image forming unit is placed, and to cause a warning to be output upon determining that the printing process has not completed based on the remaining print data to be printed.

Hereinafter, an image forming apparatus and an image forming method according to an embodiment will be described with reference to the drawings.

Figure 1:
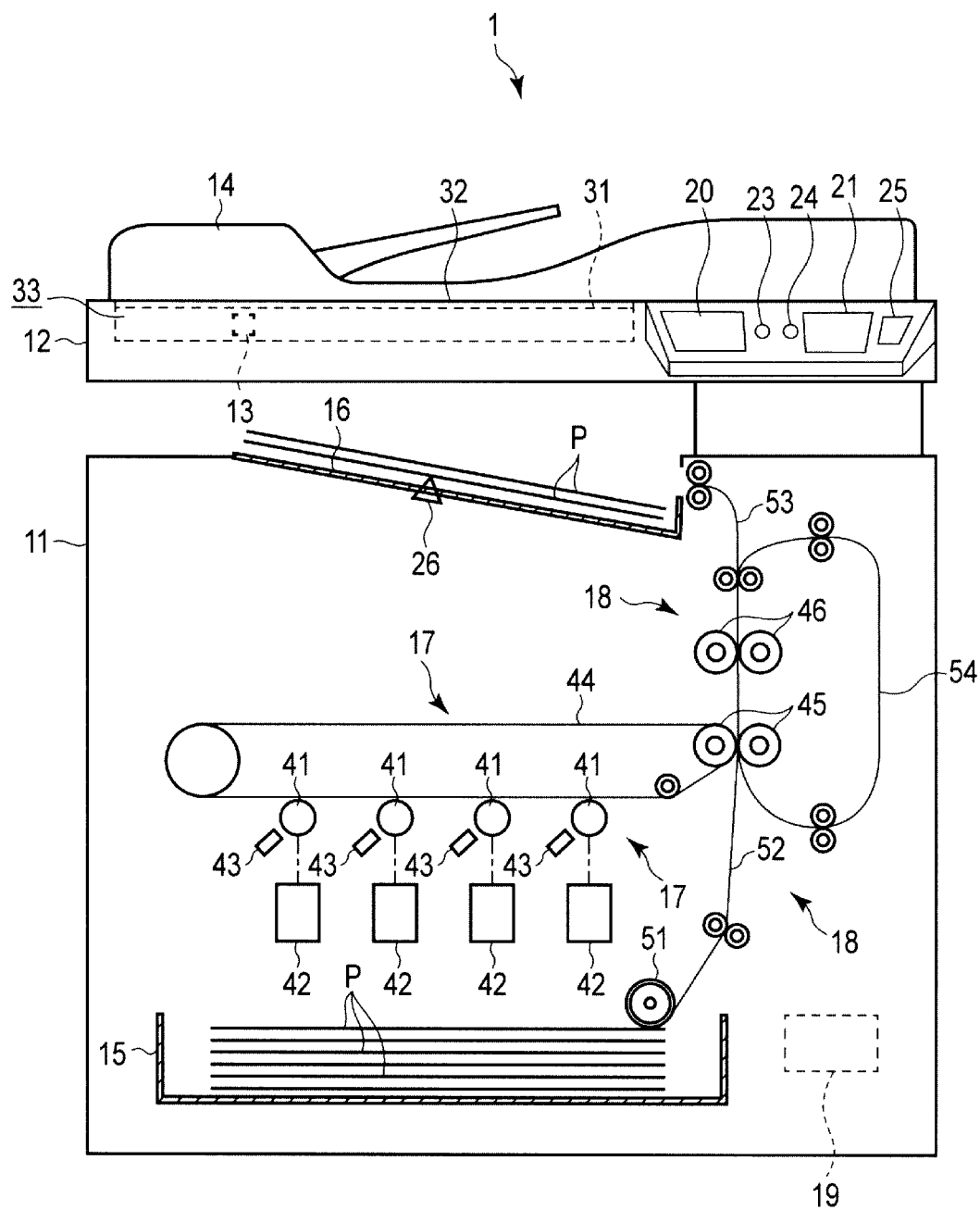
FIG. 1 is a diagram for explaining a configuration example of an image forming apparatus according to an embodiment.
Figure 2:
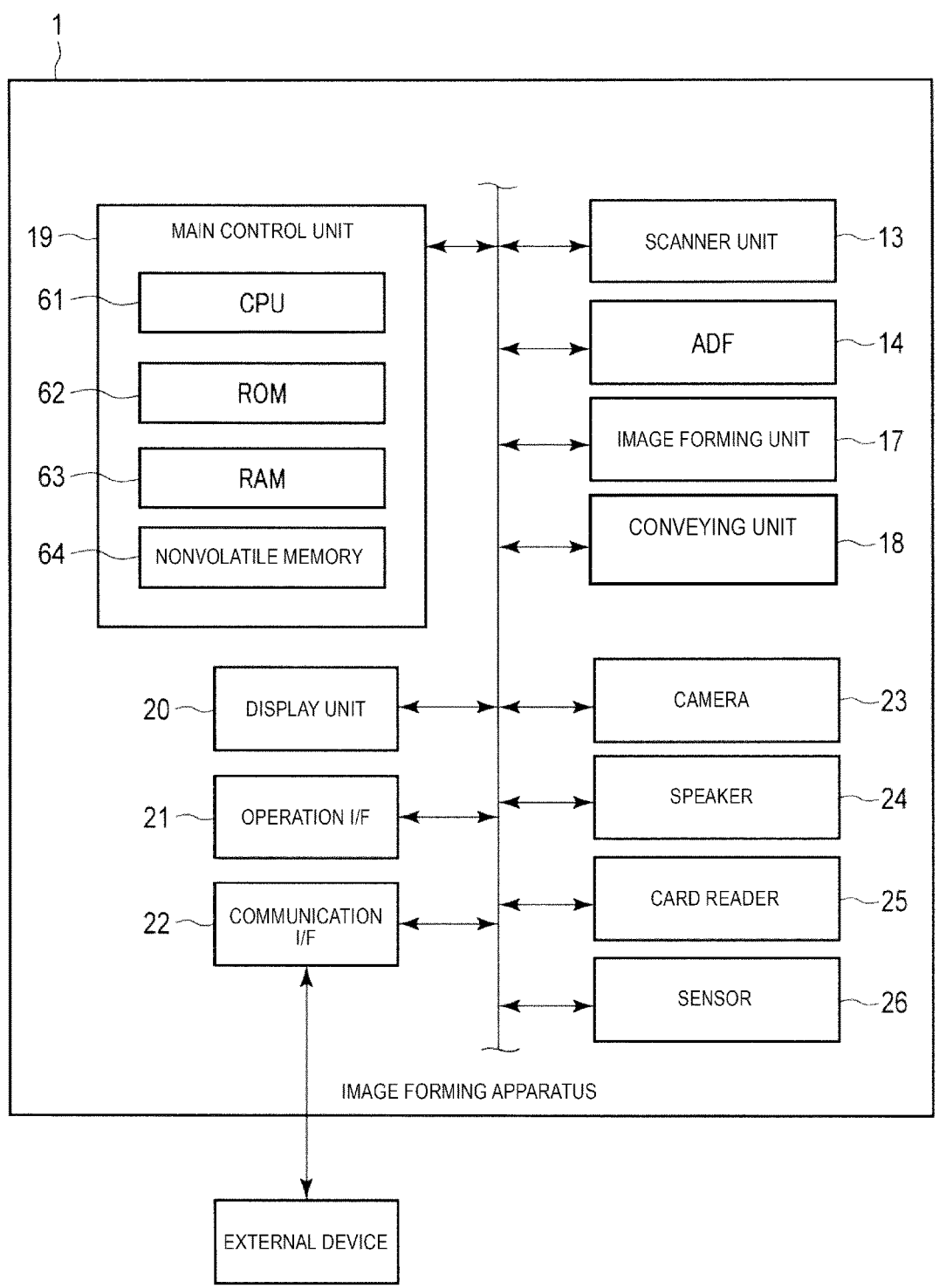
FIG. 2 is a diagram for explaining a configuration example of the image forming apparatus.

FIG. 1 is an explanation diagram illustrating a configuration example of an image forming apparatus 1 according to the embodiment. FIG. 2 is a block diagram illustrating a function provided in the image forming apparatus 1 as a block.

For example, the image forming apparatus 1 is a multi-function peripheral (MFP) that performs various processes such as image formation while conveying a recording medium such as a print medium. For example, the image forming apparatus 1 is a solid-state scanning type printer (for example, LED printer) that scans a LED array performing various processes such as image formation while conveying the recording medium such as the print medium. In addition, the image forming apparatus 1 may be an ink jet type printer (ink jet printer) that scans ink jet heads that ejects ink or may be another type printer. In the embodiment, it is assumed that the image forming apparatus 1 is a LED printer.

The image forming apparatus 1 irradiates a photoconductive drum with light corresponding to image data for printing by charging the photoconductive drum so as to form a latent image (e.g., electrostatic latent image) on the photoconductive drum. The image forming apparatus 1 attaches a toner to the latent image formed on the photoconductive drum, and transfers the toner attached to the latent image onto the print medium. In addition, the image forming apparatus 1 nips the print medium on which the toner image is transferred between fixing rollers heated to a predetermined temperature by a heater, and fixes the toner image to the print medium.

In addition, the image forming apparatus 1 forms an image of a print medium using light which is reflected after having been irradiated on the print medium. The reflected light is focused on an image sensor which converts charge accumulated in the image sensor into a digital signal to be read.

The image forming apparatus 1 includes a housing 11, a document platen 12, a scanner unit 13, an automatic document feeder (ADF) 14, a sheet feeding cassette 15, a paper discharge tray 16, an image forming unit 17, a conveying unit 18, a main control unit 19, a display unit 20, an operation I/F 21, a communication I/F 22, a camera 23, a speaker 24, a card reader 25, and a sensor 26.

The housing 11 is the main body holding the document platen 12, the scanner unit 13, the ADF 14, the sheet feeding cassette 15, the paper discharge tray 16, the image forming unit 17, the conveying unit 18, the main control unit 19, the display unit 20, the operation I/F 21, the communication I/F 22, the camera 23, the speaker 24, the card reader 25, and the sensor 26 therein.

The document platen 12 is a portion on which a print medium P as an original document to be read is placed. The document platen 12 includes a glass plate 31 having a placement surface 32 on which the print medium P as the original document is placed and a space 33 located on the opposite side of the placement surface 32 of the glass plate 31.

The ADF 14 is a mechanism for conveying the print medium P along a sheet conveying path thereof. The ADF 14 is located on the upper surface side of the document platen 12 so as to be able to be opened and closed. The ADF 14 picks up the print medium P placed on a tray thereof and conveys the print medium P while the print medium P comes into close contact with the placement surface 32 of the glass plate 31 according to the control of the main control unit 19.

The scanner unit 13 reads an image on the surface of the print medium P according to the control of the main control unit 19. The scanner unit 13 is disposed in the space 33 of the document platen 12. The scanner unit 13 includes an image sensor, an optical element, a light device, or the like.

The image sensor is an imaging element in which pixels for converting light into an electrical image signal are arranged in a line manner. For example, the image sensor is configured by a charge coupled device (CCD), a complementary metal oxide semiconductor (CMOS), or another imaging element.

The optical element is an element for focusing an image of light from a predetermined read range on pixels of the image sensor. The read range of the optical element is a region of the line shape on the placement surface 32 of the document platen 12. An image of light reflected by the print medium P placed on the placement surface 32 and transmitted through the glass plate 31 is input into the optical element. The optical element focuses the input image of light on the pixels of the image sensor.

The light device irradiates the print medium P with light. The light device includes a light source and a light guide member for irradiating the print medium P with light from the light source. The light device irradiates the light emitted from the light source to a region including the read range of the optical element by the light guide member.

In order to read the surface of the print medium P placed on the placement surface 32, the scanner unit 13 is driven by a driving mechanism (not illustrated) in a sub-scanning direction which is orthogonal to the arrangement direction (i.e., main scanning direction) of the pixels of the image sensor and parallel to the placement surface 32. The scanner unit 13 is driven in the sub-scanning direction, and continuously reads an images line by line using the image sensor, and there by obtains overall image data of the print medium P placed on the placement surface 32.

In addition, when the print medium P is conveyed by the ADF 14, the scanner unit 13 is located at a position facing a position where the print medium P comes into close contact with the placement surface 32. The scanner unit 13 continuously reads images line by line using the image sensor from the print medium P conveyed by the ADF 14, and thereby obtains the overall image data of the print medium P conveyed by the ADF 14 (original document image data).

The sheet feeding cassette 15 is a cassette configured to accommodate the print medium P. The print medium P is supplied to the sheet feeding cassette 15 from an outside of the housing 11. For example, the sheet feeding cassette 15 is configured to be pulled out from the housing 11.

The paper discharge tray 16 is a tray to receive the print medium P discharged from the conveying unit 18. In addition, the sensor 26, which will be described below, is located in the paper discharge tray 16.

The image forming unit 17 forms an image on the print medium P based on the control of the main control unit 19. For example, the image forming unit 17 charges an outer circumferential surface of a drum, forms the latent image according to the image data for printing on the charged surface of the drum, attaches a toner to the latent image formed on the drum, and transfers the toner attached to the latent image onto the print medium P, and thereby fixes the toner image to the print medium P. For example, as illustrated in FIG. 1, the image forming unit 17 includes a drum 41, an exposure unit 42, a developing device 43, a transfer belt 44, a pair of transfer rollers 45, and a pair of fixing rollers 46.

The drum 41 is a cylindrical photoconductive drum. The drum 41 is provided so as to be in contact with the outer circumferential surface of the transfer belt 44 which has an endless shape. The outer circumferential surface of the drum 41 is uniformly charged by a charger (not illustrated). In addition, the drum 41 rotates at a constant speed by the driving mechanism (not illustrated).

The exposure unit 42 forms an electrostatic latent image on the outer circumferential surface of the charged drum 41. The exposure unit 42 forms the electrostatic latent image on the outer circumferential surface of the drum 41 by irradiating a surface of the drum 41 with a laser beam from a light emitting element or the like according to the print data. The exposure unit 42 includes a light emitting unit and the optical element.

The light emitting unit includes a configuration (for example, LED array) in which the light emitting elements that emit light according to the electric signal (i.e., image signal) are arranged in a line manner. The light emitting element of the light emitting unit emits light of a wavelength which can form the latent image on the charged drum 41. The light emitted from the light emitting unit is focused as an image on the surface of the drum 41 by the optical element.

The developing device 43 attaches a toner (i.e., developer) to the electrostatic latent image formed on the drum 41. With this, the developing device 43 forms an image of the toner on the surface of the drum 41.

For example, the drum 41, the exposure unit 42, and the developing device 43 of the image forming unit 17 are respectively provided for each different color such as cyan, magenta, yellow, and black. In this case, each of a plurality of developing devices 43 holds the toner of different colors.

The transfer belt 44 is an endless member for receiving the toner image formed on the surface of the drum 41, and for transferring the toner image to the print medium P. The transfer belt 44 is rotated by rotation of a roller. The transfer belt 44 receives the toner image formed on the drum 41 at a position in contact with the drum 41, and transfers the received toner image to a print medium P which is sandwiched and conveyed by the transfer belt 44 and one of the pair of transfer rollers 45.

The pair of transfer rollers 45 is configured to nip the transfer belt 44. The pair of transfer rollers 45 transfers the toner image on the transfer belt 44 to the print medium P.

The pair of fixing rollers 46 is configured to nip the print medium P. The pair of fixing rollers 46 is heated by a heater (not illustrated). The pair of fixing rollers 46 fixes the toner image formed on the print medium P by applying pressure and heat to the nipped print medium P. That is, the pair of fixing rollers 46 fixes an image onto the print medium P.

The conveying unit 18 conveys the print medium P. The conveying unit 18 includes a conveying path configured by a plurality of guides and a plurality of rollers, and a sensor that detects a conveyed position of the print medium P on the conveying path. The conveying path is a path to convey the print medium P. A conveying roller rotates by a motor operated based on the control of the main control unit 19, and thereby conveys the print medium P along the conveying path. In addition, some guides (e.g., flappers) among the plurality of guides rotate by a motor operated based on the control of the main control unit 19, and thereby switch the conveying path conveying the print medium P.

For example, as illustrated in FIG. 1, the conveying unit 18 includes a pick-up roller 51, a paper feed conveying path 52, a paper discharge conveying path 53, and a reverse conveying path 54.

The pick-up roller 51 picks up the print medium P accommodated in the sheet feeding cassette 15 and feeds the picked up print medium P to the paper feed conveying path 52.

The paper feed conveying path 52 is the conveying path for conveying the print medium P picked up from the sheet feeding cassette 15 by the pick-up roller 51 to the image forming unit 17.

The paper discharge conveying path 53 is the conveying path for discharging the print medium P on which an image is formed by the image forming unit 17 from the housing 11. The print medium P discharged through the paper discharge conveying path 53 is discharged to the paper discharge tray 16.

The reverse conveying path 54 is the conveying path for supplying the print medium P to the image forming unit 17 again in a state where the front and back sides and the leading and trailing edges of the print medium P on which the image is formed by the image forming unit 17 are reversed.

The main control unit 19 controls the image forming apparatus 1. The main control unit 19 includes, for example, a CPU 61, a ROM 62, a RAM 63, and a nonvolatile memory 64.

The CPU 61 is a processor. The CPU 61 performs various processes based on data such as a program stored in the ROM 62. The CPU 61 executes the program stored in the ROM 62, and thereby functions as a control unit which can perform various operations. Each of the functions of the main control unit 19 can be also realized by control circuit, ASIC, or a combination thereof.

The ROM 62 is a read-only nonvolatile memory. The ROM 62 stores the program and data or the like used in the program.

The RAM 63 is a volatile memory that functions as a working memory. The RAM 63 temporarily stores data or the like under processing of the CPU 61. In addition, the RAM 63 temporarily stores the program executed by the CPU 61.

The nonvolatile memory 64 is a storage medium which can store various types of information. The nonvolatile memory 64 stores the program and data or the like used in the program. For example, the nonvolatile memory 64 is a solid state drive (SSD), a hard disk drive (HDD), or another storage device. Instead of the nonvolatile memory 64, a memory I/F such as a card slot into which the storage medium such as a memory card can be inserted may be provided.

The display unit 20 includes a display that displays a screen according to a video signal input from the main control unit 19 or a display control unit such as a graphic controller (not illustrated). For example, a screen for various settings of the image forming apparatus 1 is displayed on a display of the display unit 20.

The operation I/F 21 is connected to an operation member (not illustrate). The operation I/F 21 supplies an operation signal in response to an operation of the operation member to the main control unit 19. For example, the operation member is a touch sensor, a numeric keypad, a power key, a paper feed key, various function keys, a keyboard, or the like. For example, the touch sensor is a resistive touch sensor, a capacitive touch sensor, or the like. The touch sensor obtains information indicating a position designated by the user in a region. The touch sensor is configured as a touch panel being integrated with the display unit 20, and inputs a signal indicating a position touched by the user on the screen displayed on the display unit 20 to the main control unit 19.

The communication I/F 22 is an interface for communicating with another device. For example, the communication I/F 22 is used for communication with a host device (external device) that transmits print data to the image forming apparatus 1. For example, the communication I/F 22 is configured as a LAN connector. In addition, the communication I/F 22 may perform wireless communication with another device according to a telecommunications standard such as Bluetooth (registered trademark) and Wi-fi (registered trademark).

The camera 23 captures a face of a person who operates the image forming apparatus 1. The camera 23 includes, for example, an image sensor, an optical element, or the like.

The image sensor is the imaging element in which pixels for converting light into the electric image signal are arranged in the line manner. For example, the image sensor is configured by the CCD, the CMOS, or another imaging element.

The optical element focuses an image of light from a predetermined read range on the pixels of the image sensor. The read range of the optical element is a predetermined range in the vicinity of the image forming apparatus 1 and is a range in which it is assumed that the face of the user operating the image forming apparatus 1 is viewed.

The speaker 24 outputs audio in response to an audio signal input from the main control unit 19. For example, the speaker 24 generates alert sound with respect to the user operating the image forming apparatus 1.

The card reader 25 is an interface for communicating with an IC card held by the user of the image forming apparatus 1. The card reader 25 performs transmission and reception of data with the IC card through contact communication or noncontact communication.

The IC card includes an IC chip and a communication circuit. The IC chip includes a processor, a ROM, a RAM, a nonvolatile memory, and the like. The nonvolatile memory of the IC chip has identification information indicating the user holding the IC card. For example, the communication circuit is configured as an antenna or a contact terminal (contact pattern). The communication circuit is electrically or magnetically connected to the card reader 25.

The card reader 25 communicates with the IC card, and thereby obtains the identification information corresponding to the user holding the IC card, from the IC card.

Figure 3:
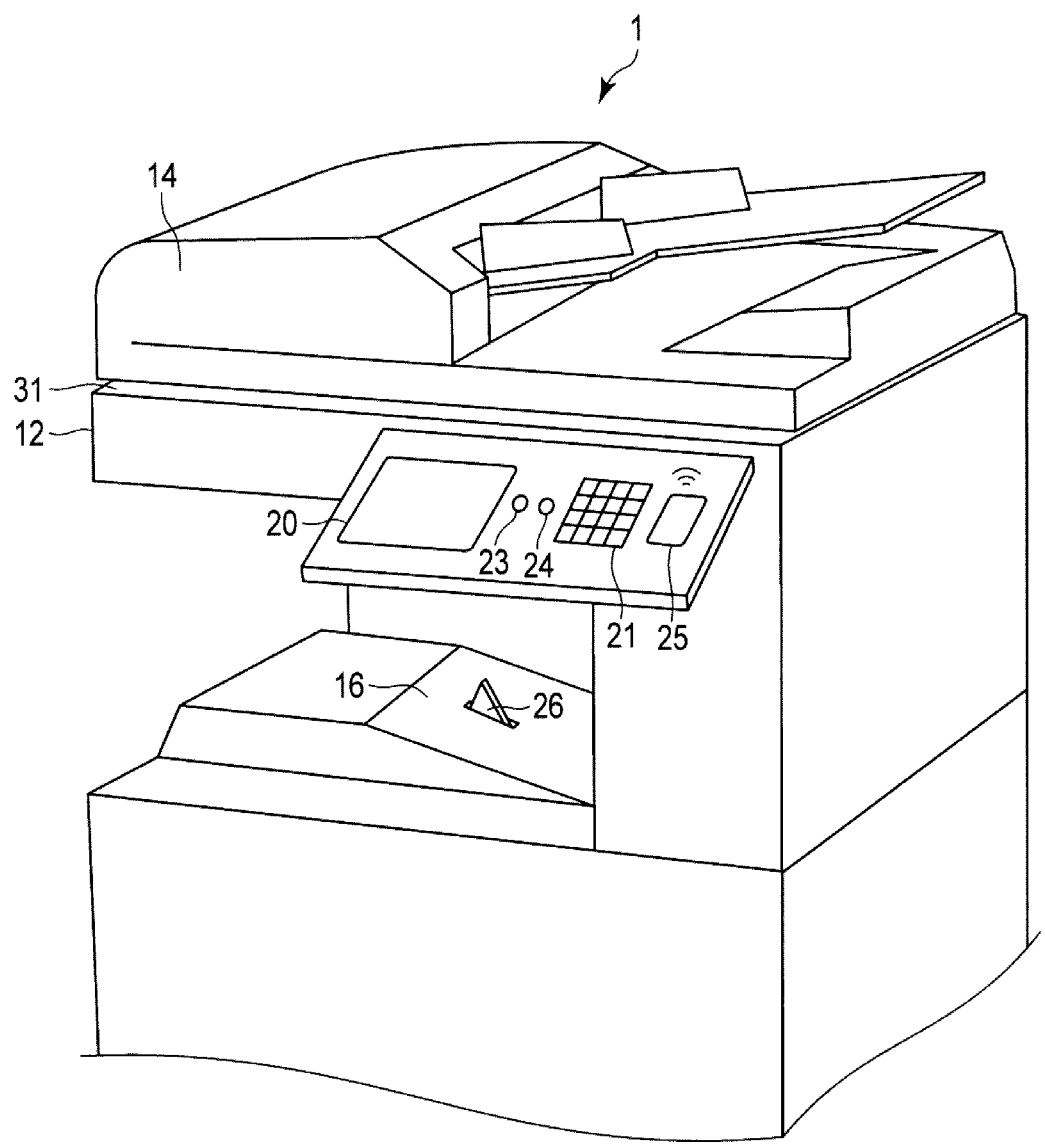
FIG. 3 is a diagram for explaining a configuration example of the image forming apparatus.

The sensor 26 is a sensor that detects whether or not the print medium P has been placed on the paper discharge tray 16. FIG. 3 is an explanation diagram for explaining a configuration in the vicinity of the paper discharge tray 16 of the image forming apparatus 1. The sensor 26 has a driving member stood up by an elastic member. The driving member is located at a position in contact with the lower surface of the print medium P discharged onto the paper discharge tray 16, and pressed down by the weight of the print medium P discharged onto the paper discharge tray 16. The sensor 26 supplies a signal indicating OFF to the CPU 61 in a state where the driving member stands up and supplies a signal indicating ON to the CPU 61 in a state in which the driving member is pressed down by the print medium P discharged onto the paper discharge tray.

Next, various operations performed by the CPU 61 will be described.

The CPU 61 executes the program stored in the ROM 62, and thereby functions as an obtaining unit that obtains the print data for forming an image on the print medium P. For example, the CPU 61 receives the print data from the external device through the communication I/F 22 which will be described below. In addition, the CPU 61 may be configured to generate the print data based on an image obtained by the scanner unit 13.

The print data may be data for forming an image on one print medium P, or may be data for forming an image on a plurality of print media P. In addition, the print data may be data including a designation of numbers of copies for repeatedly printing the same contents.

In addition, the CPU 61 executes the program stored in the ROM 62, and thereby performs a printing process for forming an image on the print medium P corresponding to the print data by the image forming unit 17. For example, the CPU 61 inputs the print data to the image forming unit 17, inputs a transport control signal of instructing the conveyance of the print medium P to the conveying unit 18, and thereby forms an image on a surface of the print medium P while conveying the print medium P through the image forming unit 17.

In addition, the CPU 61 executes the program stored in the ROM 62, and thereby functions as a determination unit that determines whether or not the print medium P has been removed from the paper discharge tray 16 in the case where the print medium P on which an image is formed by the image forming unit 17 is placed on the paper discharge tray 16.

The CPU 61 determines whether or not the print medium P on which the image is formed is placed on the paper discharge tray 16 based on a signal from the sensor 26. For example, when a detected result of the sensor 26 is ON, the CPU 61 determines that the print medium P is placed on the paper discharge tray 16. On the other hand, when the detected result of the sensor 26 is OFF, the CPU 61 determines that the print medium P is not placed on the paper discharge tray 16.

Furthermore, the CPU 61 determines whether or not the print medium P has been removed from the paper discharge tray 16 based on the signal from the sensor 26. For example, when the detected result of the sensor 26 is changed from ON to OFF, the CPU 61 determines that the print medium P that was on the paper discharge tray 16 has been removed from the paper discharge tray 16. With this, the CPU 61 determines whether or not the print medium P has been removed from the paper discharge tray 16.

In addition, when the print medium P is removed from the paper discharge tray 16, the CPU 61 determines whether or not the printing process has completed based on the print data. When the print medium P is removed from the paper discharge tray 16, if the printing process based on the print data has not completed, the CPU 61 functions as a notifying unit that outputs a warning through the display unit 20 and/or the speaker 24.

For example, when the print medium P is removed from the paper discharge tray 16 and an operation of the image forming unit 17 is interrupted, the CPU 61 determines that the printing process has not completed. In addition, for example, when the print medium P is removed from the paper discharge tray 16 and printing of all pages indicated by the print data has not completed, the CPU 61 determines that the printing process has not completed. In addition, for example, when the print medium P is removed from the paper discharge tray 16 and printing of all copies indicated by the print data has not completed, the CPU 61 determines that the printing process has not completed. In addition, for example, when the print medium P is removed from the paper discharge tray 16 and overall printing based on a plurality of pieces of print data has not completed, the CPU 61 determines that the printing process has not completed.

Next, the printing process in the image forming apparatus 1 will be described.

Figure 4:
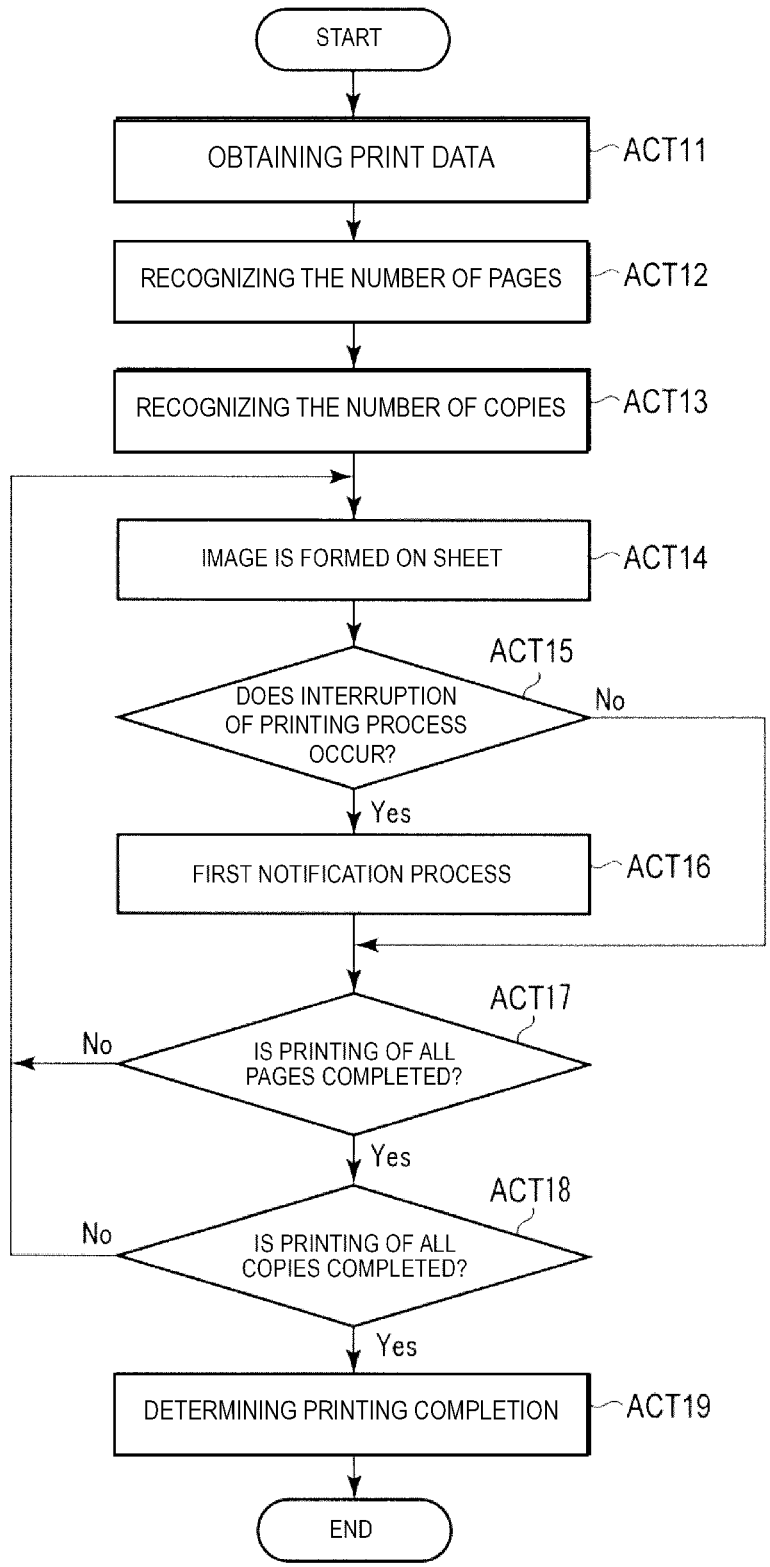
FIG. 4 is a flowchart depicting an operation example of the image forming apparatus.

FIG. 4 is a flowchart depicting the printing process in the image forming apparatus 1.

The CPU 61 of the image forming apparatus 1 obtains the print data (Act 11). For example, the CPU 61 receives the print data from the external device through the communication I/F 22. In addition, the CPU 61 may be configured to generate the print data based on an image obtained by the scanner unit 13.

The print data may be data for forming an image on one print medium P, and data for forming an image on the plurality of print media P. In addition, the print data may be data including the designation of number of copies for printing the same contents.

The CPU 61 starts the printing process based on the print data when the print data is obtained. First, the CPU 61 recognizes numbers (number of pages) of the print media to be printed based on the print data (Act 12). Next, the CPU 61 recognizes the number of copies to be printed based on the print data (Act 13).

The CPU 61 forms an image on one print medium P based on the print data (Act 14). That is, the CPU 61 controls the conveying unit 18 to pick-up the print medium P from the sheet feeding cassette 15 and conveys the print medium P to the image forming unit 17. Furthermore, the CPU 61 controls the image forming unit 17, and thereby causes to form an image on the print medium P according to the print data. Furthermore, the CPU 61 controls the conveying unit 18, and thereby causes to discharge the print medium P on which an image is formed by the image forming unit 17 onto the paper discharge tray 16.

The CPU 61 determines whether or not an interruption of the printing process has occurred (Act 15). For example, the CPU 61 sequentially determines whether or not the out of the sheet occurs, the out of the toner occurs, the jam occurs, and an image stabilization process is being performed. When the out of the sheet occurs, the out of the toner occurs, the jam occurs, or the image stabilization process is being performed, the CPU 61 determines that the interruption of the printing process has occurred.

For example, the CPU 61 determines whether or not the out of the sheet occurs based on a detected result of a sensor (not illustrated) installed in the sheet feeding cassette 15. In addition, for example, the CPU 61 determines whether or not the out of the toner occurs based on a detected result of a sensor (not illustrated) installed in the developing device 43. In addition, for example, the CPU 61 determines whether or not a jam of a state where the print medium P is jammed on the conveying path and not conveyed, occurs, based on a detected result of a sensor (not illustrated) arranged along the conveying path of the conveying unit 18. In addition, for example, the CPU 61 determines whether or not the image stabilization process which is a process of adjusting the toner density of the toner image, a position in which the toner image is formed, or the like, is being performed in the image forming unit 17.

When the out of the sheet occurs, the out of the toner occurs, the jam occurs, or the image stabilization process is being performed, the CPU 61 interrupts the printing process. In addition, when the cause of the interruption of the printing process is solved, the CPU 61 restarts the interrupted printing process. That is, when the paper is replenished, the toner is replenished, the jammed print medium P is removed, or the image stabilization process has completed, the CPU 61 restarts the interrupted printing process.

When the interruption of the printing process occurs (Act 15, Yes), the CPU 61 performs a first notification process according to which the warning to be output (Act 16). For example, the CPU 61 causes the display unit 20 to display information corresponding to the cause of the interruption of the printing process, and thereby notifies a user that the printing process is interrupted. When it is determined that the interruption of the printing process does not occur in Act 15 (Act 15, No), the CPU 61 transitions to a process of Act 17.

The CPU 61 determines whether or not printing of all pages has completed (Act 17). For example, the CPU 61 counts the number of printed pages every time printing of one page has completed, and when the counted value reaches the number of pages recognized in ACT 12, the CPU 61 determines that the printing of all pages has completed. When it is determined that the printing of all pages has not completed (Act 17, No), the CPU 61 transitions to a process of Act 14. In addition, when it is determined that the printing of all pages has completed (Act 17, Yes), the CPU 61 transitions to a process of Act 18.

The CPU 61 determines whether or not the printing of all copies has completed (Act 18). For example, the CPU 61 counts the number of sheets of which printing has completed every time the printing of each copy (per page set) has completed, and when the counted number reaches the number of sheets recognized in Act 13, the CPU 61 determines that the printing of all copies has completed. When it is determined that the printing of all copies has not completed (Act 18, No), the CPU 61 transitions to a process of Act 14.

In addition, when it is determined that the printing of all copies has completed (Act 18, Yes), the CPU 61 determines that the printing process has completed based on the print data obtained in Act 11 (Act 19), and ends the process. When the CPU 61 received new print data in processes of Act 11 to Act 19, the CPU 61 may be configured to perform processes of Act 12 to Act 19 by transitioning the process to Act 12.

In addition, the CPU 61 may be configured to store flag information indicating whether the printing process has completed, in the nonvolatile memory 64. When the print data is obtained in Act 11, the CPU 61 rewrites the flag information to a state indicating that the printing process has not completed. In addition, when it is determined that the printing process has completed in Act 19, the CPU 61 rewrites the flag information to a state indicating that the printing process has completed.

Figure 5:
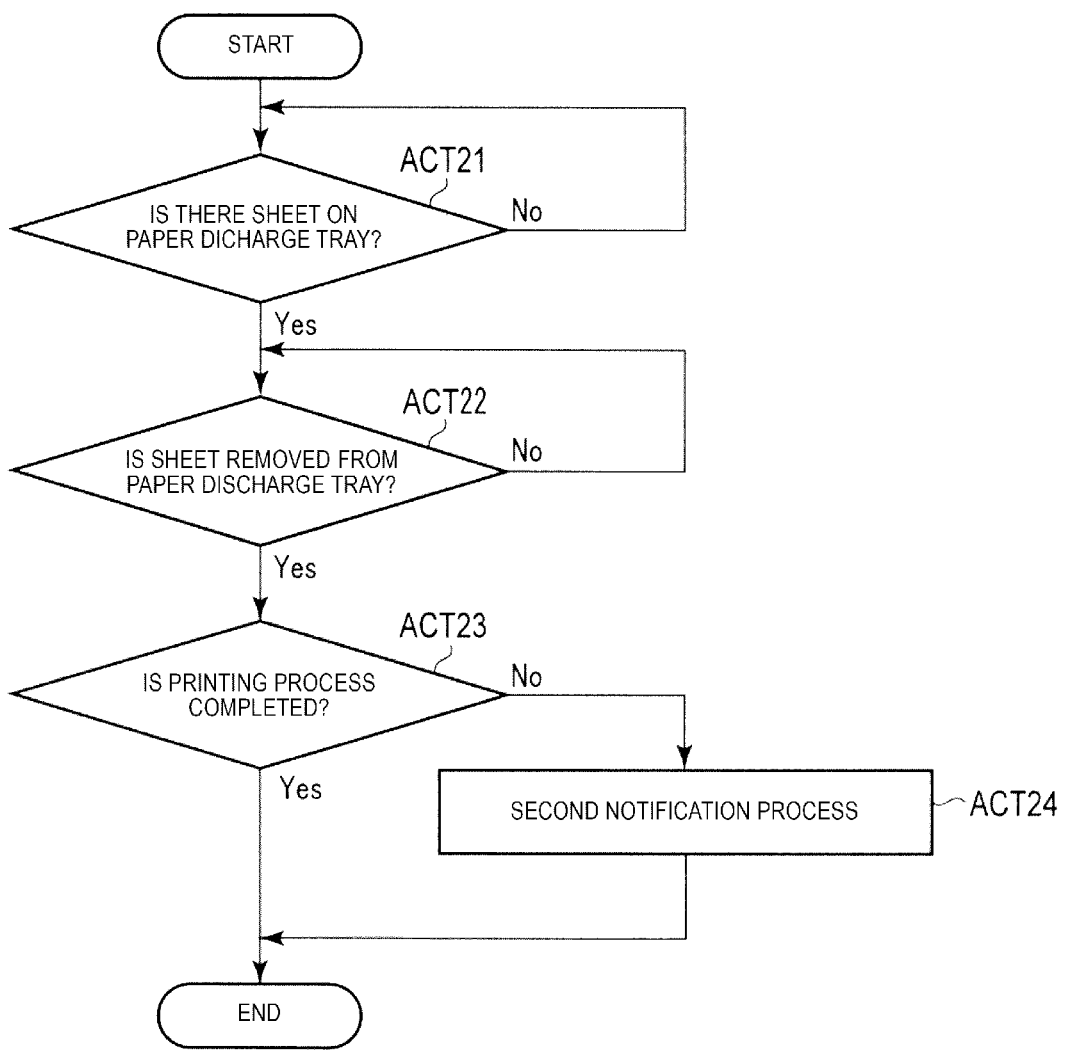
FIG. 5 is a flowchart depicting an operation example of the image forming apparatus.

FIG. 5 is a flowchart depicting a process at the time of removing the print medium P from the paper discharge tray 16 of the image forming apparatus 1. The CPU 61 of the image forming apparatus 1 performs a process illustrated in FIG. 5 in parallel with the printing process illustrated in FIG. 4.

The CPU 61 determines whether or not the print medium P on which an image is formed is placed on the paper discharge tray 16 (Act 21). For example, when a detected result of the sensor 26 is ON, the CPU 61 determines that the print medium P is placed on the paper discharge tray 16. In addition, for example, when the detected result of the sensor 26 is OFF, the CPU 61 determines that the print medium P is not placed on the paper discharge tray 16.

When it is determined that the print medium P is not placed on the paper discharge tray 16 (Act 21, No), the CPU 61 performs the determination of Act 21 again.

When it is determined that the print medium P is placed on the paper discharge tray 16 (Act 21, Yes), the CPU 61 determines whether or not the print medium P on the paper discharge tray 16 is removed (Act 22). For example, when the detected result of the sensor 26 is changed from ON to OFF, the CPU 61 determines that the print medium P on the paper discharge tray 16 has been removed.

When it is determined that the print medium P on the paper discharge tray 16 has not been removed (Act 22, No), the CPU 61 performs the determination of Act 22 again.

When it is determined that the print medium P on the paper discharge tray 16 has been removed (Act 22, Yes), the CPU 61 determines whether or not the printing process is completed (Act 23). For example, when the interruption of the printing process occurs, the CPU 61 determines that the printing process has not completed. That is, when the out of the sheet occurs, the out of the toner occurs, the jam occurs, or the image stabilization process is being performed, the CPU 61 determines that the printing process has not completed. In addition, for example, when the printing of all pages based on the print data has not completed, the CPU 61 determines that the printing process has not completed. In addition, for example, when the printing of all copies based on the print data has not completed, the CPU 61 determines that the printing process has not completed. In other words, when both of the printing of all copies and the printing of all pages based on the print data are completed without occurring the interruption of the printing process, the CPU 61 determines that the printing process has completed.

In addition, a configuration in which when the flag information stored in the nonvolatile memory 64 is sequentially rewritten according to whether or not the printing process has completed, the CPU 61 determines whether or not the printing process has completed based on the flag information stored in the nonvolatile memory 64, may be implemented. That is, when the flag information stored in the nonvolatile memory 64 indicates that the printing process has completed, the CPU 61 determines that the printing process has completed. On the other hand, when the flag information stored in the nonvolatile memory 64 indicates that the printing process has not completed, the CPU 61 determines that the printing process has not completed.

When it is determined that the printing process has completed (Act 23, Yes), the CPU 61 ends a process in FIG. 5 without performing the process.

In addition, when it is determined that the printing process has not completed (Act 23, No), the CPU 61 performs a second notification process that according to which the warning is output (Act 24), and ends the process of FIG. 5. For example, the CPU 61 causes the speaker 24 to generate a predetermined warning sound, and thereby causes the warning to be output to the user. In addition, for example, the CPU 61 displays information indicating the print data of which printing process has not completed, on the display unit 20, and thereby causes the warning to be output. Furthermore, the CPU 61 may urge a user's attention by blinking the display on the display unit 20, changing color, or the like. With this, the CPU 61 can notify the user that the printing process has not completed, that is, the print medium P which is not yet discharged exists.

The CPU 61 performs the second notification process by a method different from the first notification process, and thereby can urge attention to remember to take out the print medium P to the user. Specifically, the CPU 61 sets a display screen, the warning sound, or the like in the second notification process different from those of the first notification process, and thereby can urge the attention to remember to take out the print medium P, which is not yet printed out, to the user.

According to the above configuration, the image forming apparatus 1 includes the image forming unit 17 that forms an image on the print medium P based on the print data, and the CPU 61. The image forming apparatus 1 discharges the print medium P on which an image is formed by the image forming unit 17, to the paper discharge tray 16. When the print medium P is removed from the paper discharge tray 16, the CPU 61 of the image forming apparatus 1 determines whether or not the printing process based on the print data has completed. When it is determined that the printing process based on the print data has not completed, the CPU 61 causes the warning to be output. According to this configuration, when the printing process based on the print data has not completed, that is, when an undischarged print medium P exists, the image forming apparatus 1 outputs the warning at a timing at which the print medium P has been removed from the paper discharge tray 16. With this, the image forming apparatus 1 can effectively notify the user that the undischarged print medium P exists. As a result, it is possible to prevent the user from forgetting to take out the print medium P from the image forming apparatus 1.

In addition, when the operation of the image forming unit 17 is interrupted, the CPU 61 determines that the printing process has not completed. For example, when the out of the sheet occurs, the out of the toner occurs, the jam occurs, or the image stabilization process is being performed, the CPU 61 determines that the printing processing has not completed. With this, the image forming apparatus 1 can effectively notify the user that the undischarged print medium P exists. As a result, it is possible to prevent the user from forgetting to take out the print medium P, which is not yet printed out, from the image forming apparatus 1.

In addition, when the print data is data for instructing performance of the plurality of copies in printing processes, the CPU 61 determines whether or not the printing process of all copies indicated by the print data has completed. When the printing process of all copies has not completed, the CPU 61 causes a warning to be output at a timing when the print medium P is removed from the paper discharge tray 16. With this, the image forming apparatus 1 can effectively notify a user that the undischarged print medium P exists. As a result, it is possible to prevent the user from forgetting to take out the print medium P from the image forming apparatus 1.

In the above-described embodiment, a configuration in which when the operation of the image forming unit 17 is interrupted, when the printing of all pages has not completed, or when the printing process of all copies has not completed, the image forming apparatus 1 outputs the warning at the timing when the print medium P is removed from the paper discharge tray 16, is described. However, the embodiment is not limited to the above example. When a plurality of the print data is obtained, the image forming apparatus 1 may determine whether or not the printing process based on the plurality of pieces of print data has completed. Furthermore, a configuration in which when the printing process based on the plurality of pieces of print data has not completed, the image forming apparatus 1 outputs the warning at the timing when the print medium P is removed from the paper discharge tray 16 may be implemented. As a result, when a user transmits a plurality of print instructions to the image forming apparatus 1, it is possible to prevent the user from forgetting to take out the print medium P from the image forming apparatus 1.

In the above-described embodiment, the CPU 61 determines whether or not the print medium P on the paper discharge tray 16 is removed in Act 22, and if it is determined that the print medium P on the paper discharge tray 16 is removed, the CPU 61 determines whether or not the printing process has completed in Act 23. However, the embodiment is not limited to the above configuration. A configuration in which the CPU 61 sequentially performs a process of Act 22 and a process of Act 23 in reverse order, may be implemented. That is, a configuration in which the CPU 61 determines whether or not the printing process has completed, when it is determined that the printing process has not completed, the CPU 61 determines whether or not the print medium P on the paper discharge tray 16 is removed, and when it is determined that the print medium P on the paper discharge tray 16 is removed, the CPU 61 performs the second notification process, may be implemented.

In the above-described embodiment, a configuration in which the sensor 26 is a sensor that detects whether or not the print medium P is discharged on the paper discharge tray 16, is described. However, the embodiment is not limited to the configuration. A configuration in which the sensor 26 detects the weight of the print medium P discharged on the paper discharge tray 16, may be implemented. When the sensor 26 is configured to detect the weight of the print medium P discharged on the paper discharge tray 16, the CPU 61 can determine whether or not the print medium P has been removed from the paper discharge tray 16 based on the weight detected by the sensor 26. Specifically, when the weight detected by the sensor 26 decreases, the CPU 61 determines that the print medium P has been removed from the paper discharge tray 16. According to the configuration, the CPU 61 can determine that a part of the plurality of print media P discharged on the paper discharge tray 16 has been removed from the paper discharge tray 16.

In addition, in the above-described embodiment, a configuration in which the image forming apparatus 1 determines whether or not the printing has completed when the print medium P is removed from the paper discharge tray 16 of the image forming apparatus 1, is described. However, the embodiment is not limited to the configuration. A configuration in which, in a case where a finisher that bundles and seals a plurality of print media P is connected to the image forming apparatus 1, the image forming apparatus 1 determines whether or not the printing has completed at the time of removing a bundle of the print media P from a tray from which the bundled print media P are discharged, may be implemented. In this case, the finisher includes a sensor for detecting that the bundle of the print media P has been removed from the tray configured to discharge the bundled print media P. The finisher supplies a signal from the sensor to the image forming apparatus 1. The image forming apparatus 1 determines whether or not the bundle of the print media P has been removed from the finisher according to the signal from the sensor of the finisher.

In the above-described embodiment, a configuration in which the sensor 26 supplies the signal indicating whether or not the print medium P is discharged on the paper discharge tray 16 to the CPU 61 according to the weight of the print medium P discharged to the paper discharge tray 16, is described. However, the embodiment is not limited to the configuration. A configuration in which the image forming apparatus 1 includes a sensor optically detecting whether or not the print medium P is discharged on the paper discharge tray 16, may be implemented.

In addition, a configuration in which the image forming apparatus 1 includes a sensor 26A for detecting access of hands into the paper discharge tray 16 instead of the sensor 26 detecting whether or not the print medium P is placed on the paper discharge tray 16, may be implemented. In this case, the image forming apparatus 1 predicts whether or not the print medium P has been removed from the paper discharge tray 16 based on a signal from the sensor 26A.

Figure 6:
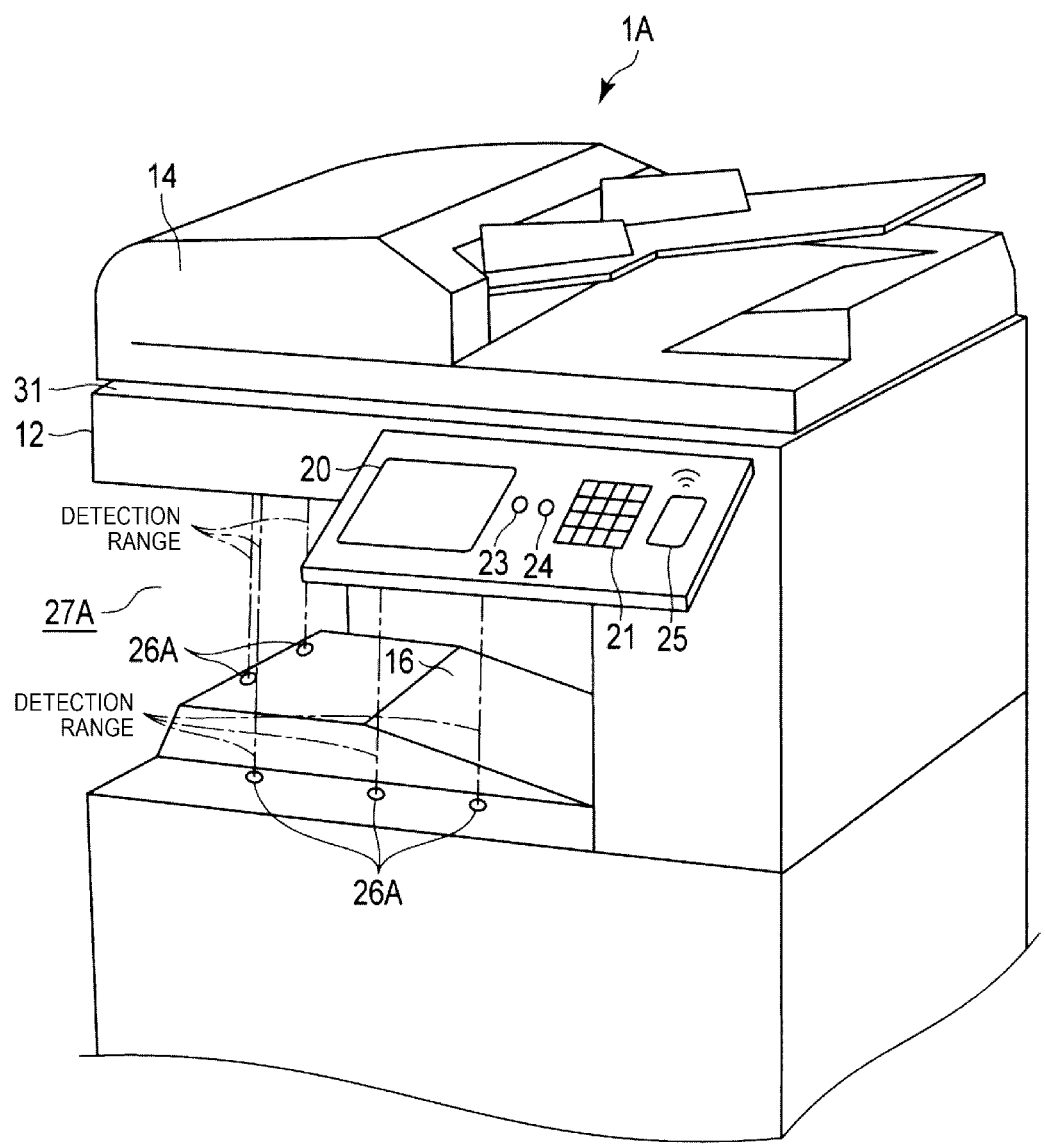
FIG. 6 is a diagram for explaining a configuration example of an image forming apparatus according to another embodiment.

FIG. 6 is an explanation diagram for explaining a configuration in the vicinity of the paper discharge tray 16 of an image forming apparatus 1A including the sensor 26A instead of the sensor 26. Since a configuration of the image forming apparatus 1A is the same as that of the image forming apparatus 1 except for the sensor 26A, a detailed description thereof will be omitted.

The sensor 26A is a sensor for detecting the access of hands to the paper discharge tray 16. The sensor 26A includes a light source, an optical system, and a light receiving element.

For example, the light source is a diode that emits light. For example, the light source emits infrared light. The optical system is a lens that emits light from the light source. In addition, the optical system focuses an image of light, which comes from a predetermined detection range on a space, on the light receiving element. The light receiving element is an element for converting the light into the electric signal. For example, the light receiving element is a photodiode having sensitivity in an infrared wavelength range.

When an object exists in the detection range of the sensor 26A, light emitted from the light source through the optical system is incident on the object. Furthermore, a part of the light incident on the object is reflected on a surface of the object and incident on the optical system. The light incident on the optical system reflected on the surface of the object is formed as an image on the light receiving element. The light receiving element generates a signal according to the light forming the image. With this, when the object exists in the detection range, the sensor 26A supplies a signal indicating ON to the CPU 61, and when the object does not exist in the detection range, the sensor 26A supplies a signal indicating OFF to the CPU 61.

The image forming apparatus 1A may include a plurality of the sensors 26A. As described in FIG. 6, the plurality of the sensors 26A are provided at positions through which a user's hand passes when it reaches the paper discharge tray 16. More specifically, an opening unit 27A which is a space for taking out the print medium P from the paper discharge tray 16 to the outside of the housing of the image forming apparatus 1A, is configured in the image forming apparatus 1A. In an example of FIG. 6, the opening unit 27A is provided over from the front surface to the side surface of the housing of the image forming apparatus 1A in the vicinity of the paper discharge tray 16. When the print medium P on the paper discharge tray 16 is taken out to the outside of the housing of the image forming apparatus 1A, objects such as hands pass through the opening unit 27A. The sensor 26A detects presence or absence of the object passing through the opening unit 27A. With this, the sensors 26A detect presence or absence of the object passing through the space between the light sources and the light receiving elements in order to detect access of the object with respect to the paper discharge tray 16.

The CPU 61 determines that the print medium P has been removed from the paper discharge tray 16 based on a signal from the sensors 26A. For example, when a user's hand is input into the paper discharge tray 16, it is predicted that a detected result of the sensors 26A is switched from OFF to ON. In addition, when the user grips the print medium P on the paper discharge tray 16 and pulls out his/her hand from the paper discharge tray 16, it is predicted that the detected result of the sensor 26A is switched from ON to OFF. Therefore, when the detected result of the sensors 26A is switched from OFF to ON, and then the detected result of the sensors 26A is switched from ON to OFF, the CPU 61 determines that the print medium P on the paper discharge tray 16 is removed.

When the plurality of sensors 26A are provided, the CPU 61 switches any one of the signals from the plurality of sensors 26A from OFF to ON, and then when signals from all the sensors 26A are OFF, the CPU 61 determines that the print medium P on the paper discharge tray 16 is removed.

When the print medium P is removed from the paper discharge tray 16, the CPU 61 determines whether or not the printing process has completed based on the print data. When the print medium P is removed from the paper discharge tray 16 and the printing process has not completed based on the print data, the CPU 61 causes the warning to be output through the display unit 20 and/or the speaker 24.

According to this configuration as well, when the printing process based on the print data has not completed, that is, the print medium P which is not yet printed out exists, the image forming apparatus 1A can output the warning at the timing when the print medium P is manually removed from the paper discharge tray 16.

The image forming apparatus 1 can capture a two-dimensional region with a camera provided at a position facing the paper discharge tray 16 without implementing the configuration such as the configuration of the sensor 26A described above and analyze the captured image, and thereby may be configured to detect the removal of the print medium P from the paper discharge tray 16.

In addition, the image forming apparatus 1 in which each user performs the determination in Act 23 of FIG. 5, may be configured. For example, the CPU 61 of the image forming apparatus 1 functions as a user identification unit that performs a user identification process for identifying the user who removes the print medium P. For example, the CPU 61 of the image forming apparatus 1 obtains a face image of the user by capturing the face of a neighboring user with the camera 23 (image capturing unit). In addition, the nonvolatile memory 64 stores in advance a plurality of elements of identification information for identifying users and face feature data corresponding to each identification information. The CPU 61 compares the obtained face image with the face feature data stored in the nonvolatile memory 64, and performs a face authentication process for identifying a user in the vicinity of the image forming apparatus based on a compared result.

Furthermore, the CPU 61 determines whether or not the printing process based on the print data input from a PC corresponding to a user specified by the face authentication process has completed. According to such a configuration, even if the printing process based on the print data from another user has not completed, if the printing process based on the print data from the specified user, has completed, the image forming apparatus 1 can be controlled so as not to output the warning when the print medium P is removed from the paper discharge tray 16.

The functions described in the above embodiments may be realized not only by using hardware but also by loading a program including each function using software into a computer. In addition, each function may be configured by selecting software or hardware as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an image forming unit configured to perform a printing process of forming an image on a print medium based on print data;
   a processor configured to determine whether or not the printing process has completed based on remaining print data to be printed, when the print medium is removed from a paper discharge tray in which the print medium on which the image is formed by the image forming unit is placed, and to cause a warning to be output upon determining that the printing process has not completed based on the remaining print data to be printed.

2. The apparatus according to claim 1, wherein the remaining print data to be printed is greater than zero.

3. The apparatus according to claim 1, wherein the processor is further configured to determine that the printing process has not completed if an operation of the image forming unit is interrupted and the print medium is removed from the paper discharge tray.

4. The apparatus according to claim 1, wherein the processor is configure,
   to perform a user identification process for identifying a user who removed the print medium from the paper discharge tray,
   wherein the processor determines that the printing process has completed based on whether or not the remaining print data to be printed is associated with the identified user.

5. The apparatus according to claim 4, further comprising:
   an image capturing unit positioned near the paper discharge tray,
   wherein the processor is configured to compare a face image captured by the image capturing unit with face feature data of a plurality of users to identify the user who removed the print medium from the paper discharge tray.

6. The apparatus according to claim 1, further comprising:
   a sensor positioned to detect whether or not the print medium has been removed from the paper discharge tray,
   wherein the processor determines that the print medium has been removed from the paper discharge tray based on a signal from the sensor.

7. The apparatus according to claim 1, further comprising:
   a speaker through which the warning is output as an audio warning.

8. The apparatus according to claim 1, further comprising:
   a display through which the warning is output as a visual warning.

9. A method of operating an image forming apparatus having an image forming unit configured to perform a printing process of forming an image on a print medium based on print data, said method comprising:
   discharging the print medium after the printing process a has been performed on the print medium based on the print data;
   detecting whether or not the print medium has been removed from a paper discharge tray;
   determining whether or not the printing process has completed based on remaining print data to be printed; and
   upon detecting that the print medium has been removed from the paper discharge tray and determining that the printing process has not completed, outputting a warning.

10. The method according to claim 9, wherein the remaining print data to be printed is greater than zero.

11. The method according to claim 9, further comprising:
    upon detecting that an operation of the image forming unit has been interrupted, determining that the printing process has not completed.

12. The method according to claim 9, further comprising:
    performing a user identification process for identifying a user who removed the print medium from the paper discharge tray,
    wherein determining whether or not the printing process has completed is based on whether or not the remaining print data to be printed is associated with the identified user.

13. The method according to claim 12, further comprising:
    capturing a face image of a user positioned near the paper discharge tray; and
    comparing the captured face image with face feature data of a plurality of users to identify the user who removed the print medium from the paper discharge tray.

14. The method according to claim 9, wherein
    a sensor is positioned to detect whether or not the print medium has been removed from the paper discharge tray, and
    detecting whether or not the print medium has been removed from the paper discharge tray is based on a signal from the sensor.

15. The method according to claim 9, wherein the warning is output through a speaker as an audio warning.

16. The method according to claim 9, wherein the warning is output through a display as a visual warning.

* * * * *

UNITED STATES PATENT AND TRADEMARK OFFICE
CERTIFICATE OF CORRECTION

PATENT NO. : 10,133,968 B2  
APPLICATION NO. : 15/721665  
DATED : November 20, 2018  
INVENTOR(S) : Atsushi Marunouchi Page 1 of 1

It is certified that error appears in the above-identified patent and that said Letters Patent is hereby corrected as shown below:

In the Claims

Column 15, Claim 4, Line 36, delete "configure" and insert --configured--.

Column 16, Claim 9, Line 11, delete "a" after "printing process".

Signed and Sealed this  
Twenty-eighth Day of May, 2019

Andrei Iancu  
*Director of the United States Patent and Trademark Office*